US 8,478,786 B2
Jul. 2, 2013

(12) United States Patent
Hays et al.

(54) AUTOMATIC LAYOUT DERIVATION AND IMPLEMENTATION

(75) Inventors: Christopher A. Hays, Monroe, WA (US); Carolyn Khanh Chau, Redmond, WA (US); Robert A. Meyers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 12/882,164

(22) Filed: Sep. 14, 2010

(65) Prior Publication Data

US 2012/0066267 A1    Mar. 15, 2012

(51) Int. Cl.
*G06F 7/00* (2006.01)
*G06F 17/30* (2006.01)

(52) U.S. Cl.
USPC .................. 707/790; 707/802; 707/803

(58) Field of Classification Search
USPC ............... 707/790, 802, 803, 999.1, 999.101
See application file for complete search history.

(56) References Cited

U.S. PATENT DOCUMENTS

| | | | | |
|---|---|---|---|---|
| 5,379,422 A | * | 1/1995 | Antoshenkov | 707/999.001 |
| 5,644,763 A | * | 7/1997 | Roy | 1/1 |
| 5,809,297 A | * | 9/1998 | Kroenke et al. | 707/999.102 |
| 6,301,581 B1 | * | 10/2001 | Smiley | 707/718 |
| 6,421,663 B1 | | 7/2002 | Chen et al. | |
| 6,895,412 B1 | * | 5/2005 | Hutchinson | 707/802 |
| 7,082,433 B2 | | 7/2006 | Anonsen et al. | |
| 7,222,130 B1 | | 5/2007 | Cras et al. | |
| 7,275,063 B2 | | 9/2007 | Horn | |
| 7,331,015 B2 | | 2/2008 | Hays et al. | |
| 7,370,273 B2 | | 5/2008 | Beyer et al. | |
| 7,610,300 B2 | | 10/2009 | Legault et al. | |
| 7,634,724 B2 | | 12/2009 | Welcker et al. | |
| 7,707,490 B2 | | 4/2010 | Hays et al. | |
| 7,739,223 B2 | | 6/2010 | Vaschillo et al. | |
| 7,752,181 B2 | * | 7/2010 | Klein et al. | 707/692 |
| 7,761,411 B2 | * | 7/2010 | Wang et al. | 707/609 |
| 2004/0068521 A1 | * | 4/2004 | Haacke et al. | 707/200 |
| 2005/0234886 A1 | | 10/2005 | Mohraz et al. | |
| 2007/0022120 A1 | | 1/2007 | Huang et al. | |
| 2007/0226337 A1 | | 9/2007 | Hays | |
| 2007/0233680 A1 | | 10/2007 | Carlson et al. | |
| 2008/0021921 A1 | | 1/2008 | Horn | |
| 2008/0091668 A1 | | 4/2008 | Dettinger et al. | |
| 2009/0150421 A1 | * | 6/2009 | Rjaibi et al. | 707/101 |
| 2010/0095289 A1 | | 4/2010 | Nguyen et al. | |
| 2010/0106750 A1 | * | 4/2010 | Melamed et al. | 707/803 |
| 2011/0161374 A1 | * | 6/2011 | Williamson | 707/802 |

OTHER PUBLICATIONS

David M. Nichols et al., "Experiences in Deploying Metadata Analysis Tools for Institutional Repositories", 2009, Cataloging & Classification Quarterly, 47 (3/4), pp. 229-248.

* cited by examiner

*Primary Examiner* — Hares Jami
(74) *Attorney, Agent, or Firm* — Workman Nydegger

(57) ABSTRACT

Embodiments are directed to determining a data insertion point in a data layout based on relative cardinalities between data objects and to determining a data insertion point in a data layout based on defined hierarchies between data objects. In an embodiment, a computer system receives a user input indicating that an additional portion of information is to be added to an existing data layout which includes multiple different data objects. The computer system accesses the data objects to determine relative cardinalities between the data objects in the data layout. The computer system determines an optimal data insertion point for inserting the additional portion of information based on the determined relative cardinalities between the data objects. The computer system also inserts the additional portion of information in the existing data layout at the determined optimal data insertion point.

20 Claims, 4 Drawing Sheets

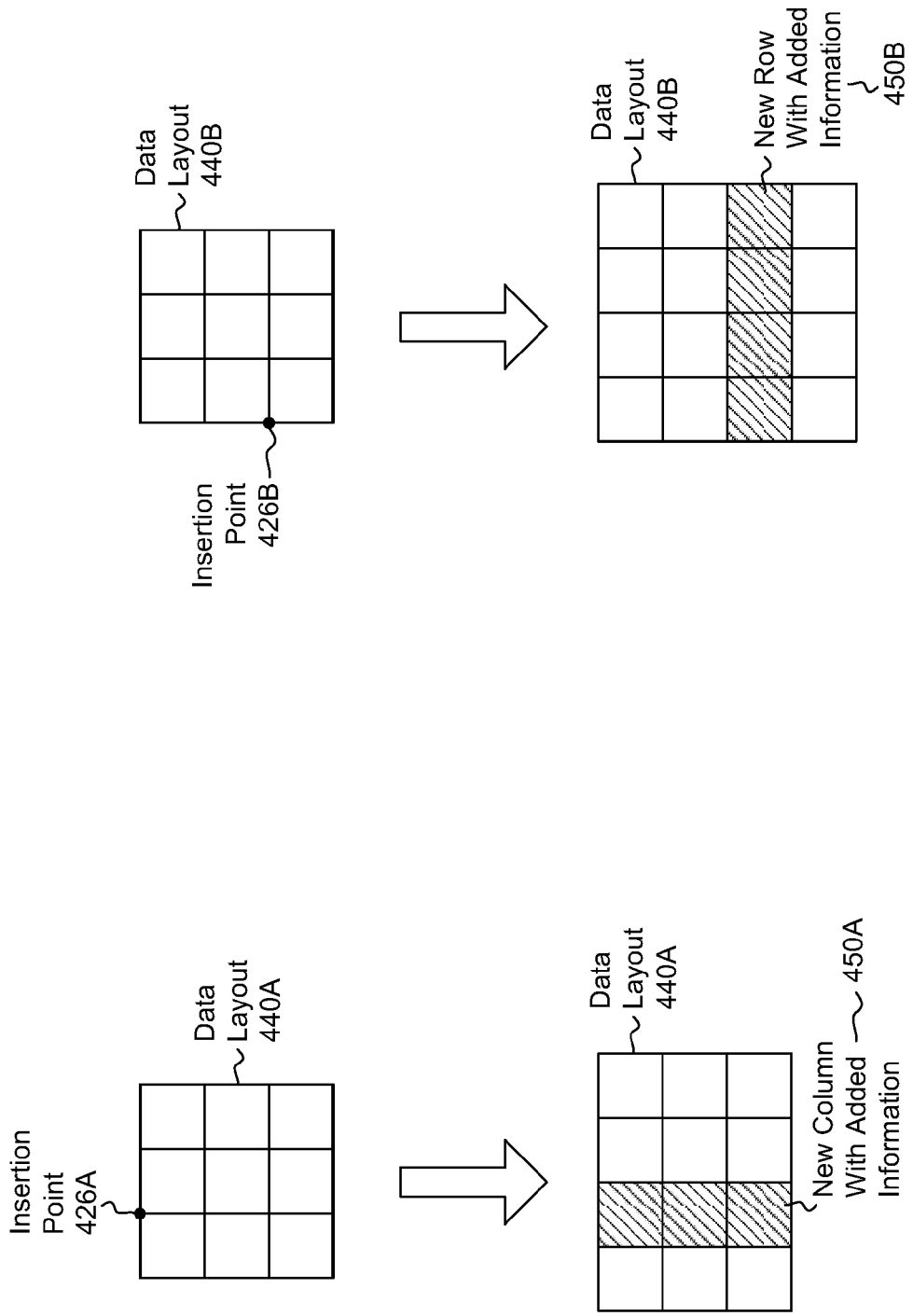

AUTOMATIC LAYOUT DERIVATION AND IMPLEMENTATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be designed to provide reports or layouts that include various types or categories of information. For example, a user may request order data from a database that includes all orders to shipped to a certain geographic region within a certain time period (e.g. all orders shipped to New York within the month of June). The requested information is retrieved from a database and presented to the user in the form of a layout or report.

To present such information, two determinations are made: 1) which data to present and 2) how to present the data. Typically, these data presentations are optimized for either query actions or layout actions. Presentations optimized for query actions generally end up with illogical default layouts which are then corrected manually by a user. Presentations optimized for layout actions generally end up with restricted query capabilities.

BRIEF SUMMARY

Embodiments described herein are directed to determining a data insertion point in a data layout based on relative cardinalities between data objects and to determining a data insertion point in a data layout based on defined hierarchies between data objects. In one embodiment, a computer system receives a user input indicating that an additional portion of information is to be added to an existing data layout which includes multiple different data objects. The computer system accesses the data objects to determine relative cardinalities between the data objects in the data layout. The computer system determines an optimal data insertion point for inserting the additional portion of information based on the determined relative cardinalities between the data objects. The computer system also inserts the additional portion of information in the existing data layout at the determined optimal data insertion point.

In another embodiment, a computer system receives a user input indicating that an additional portion of information is to be added to an existing data layout which includes multiple different data objects. The computer system accesses the data objects to determine various defined hierarchies between the data objects in the data layout. The computer system determines an optimal data insertion point for inserting the additional portion of information based on the defined hierarchies between the data objects. The computer system also inserts the additional portion of information in the existing data layout at the determined optimal data insertion point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIGS. 4A and 4B illustrate embodiments of the present invention in which data is inserted at an optimal insertion point.

DETAILED DESCRIPTION

Figure 1:
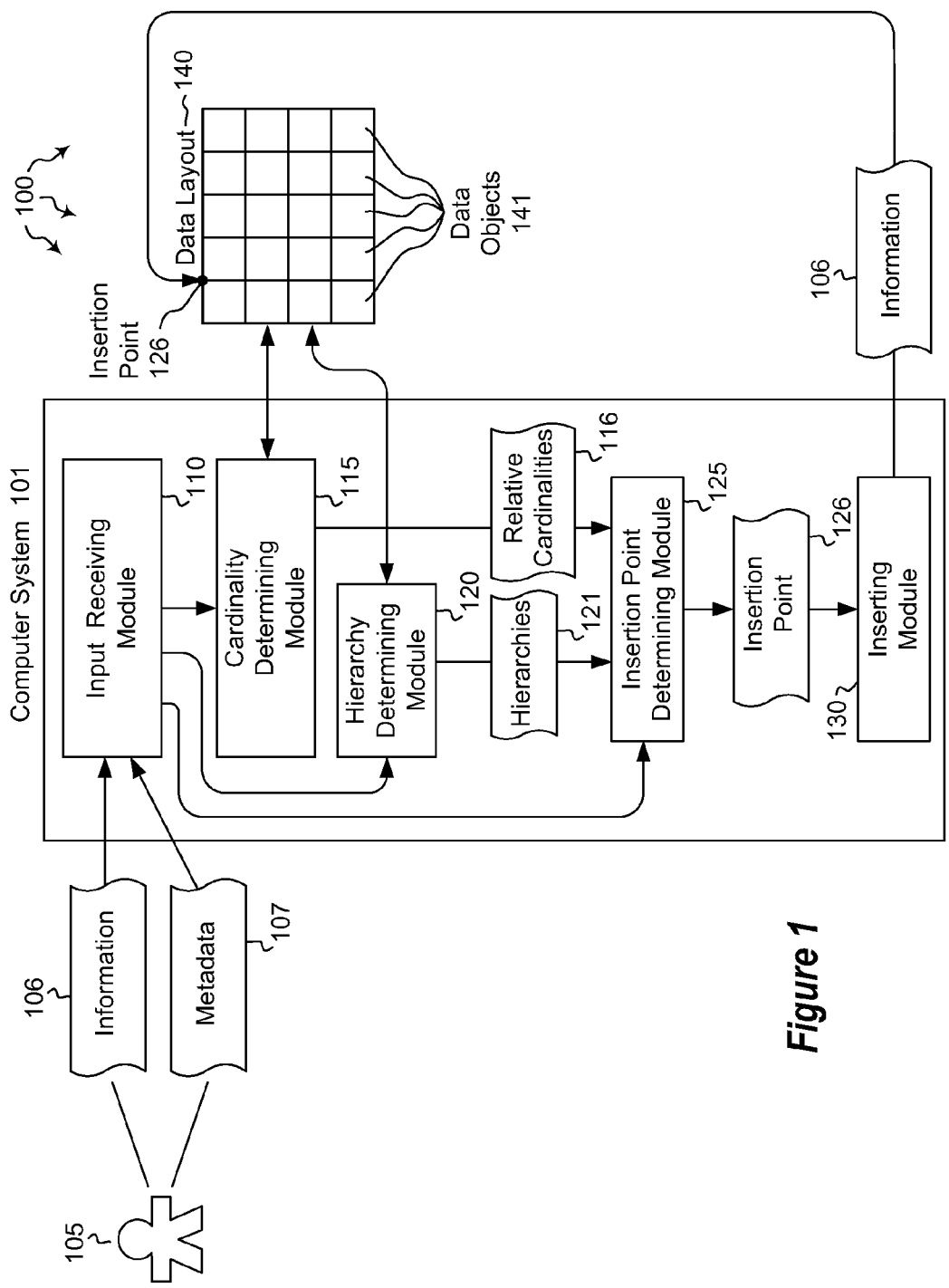
FIG. 1 illustrates a computer architecture in which embodiments of the present invention may operate including determining a data insertion point in a data layout based on relative cardinalities between data objects and determining a data insertion point in a data layout based on defined hierarchies between data objects.

Embodiments described herein are directed to determining a data insertion point in a data layout based on relative cardinalities between data objects and to determining a data insertion point in a data layout based on defined hierarchies between data objects. In one embodiment, a computer system receives a user input indicating that an additional portion of information is to be added to an existing data layout which includes multiple different data objects. The computer system accesses the data objects to determine relative cardinalities between the data objects in the data layout. The computer system determines an optimal data insertion point for inserting the additional portion of information based on the determined relative cardinalities between the data objects. The computer system also inserts the additional portion of information in the existing data layout at the determined optimal data insertion point.

In another embodiment, a computer system receives a user input indicating that an additional portion of information is to be added to an existing data layout which includes multiple different data objects. The computer system accesses the data objects to determine various defined hierarchies between the data objects in the data layout. The computer system determines an optimal data insertion point for inserting the additional portion of information based on the defined hierarchies between the data objects. The computer system also inserts the additional portion of information in the existing data layout at the determined optimal data insertion point.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. Computer system 101 includes various different interconnected modules configured to perform different functions. As will be understood by one skilled in the art, computer system 101 may include any type of computer, processor or system that processes software inputs and provides an output. As shown in FIG. 1, computer system 101 includes input receiving module 110. The input receiving module may receive various different types of inputs including information inputs 106, metadata inputs 107 or any other type of inputs from user 105 or from another computer system (not shown).

In some embodiments, the information 106 may be information or data that is to be added to a data layout (e.g. data layout 140). As used herein, a data layout refers to any presentation, organization or arrangement of data, and in particular those data presentations that are prepared for a human user. Such data layouts may include any type of information including text, pictures, videos, documents (or portions thereof) or other information. A layout may include one or more nested collections of groups of data objects, and each group of data objects may include detail information to display at each grouping level.

In some cases, the grouping and/or layout information may be arranged such that the layout is easy for a human user to read and understand. For instance, text describing a picture would be placed near the picture, so as to ensure that the user is not confused as to which picture the text belongs. Coloring, positioning, combining of media and text and other techniques can be used to make the data more understandable. In some cases, the data objects (e.g. 141) may be arranged in a tabular fashion, as in data layout 140. In such cases, data may be inserted at an insertion point 126 in either a row or column. Insertion point determining module 125 determines where to insert the data.

To make this determination, insertion point determining module 125 receives different inputs. For instance, it receives a relative cardinalities input 116 from cardinality determining module. In layouts, data is often related to other data and stored as related data in a relational database. The relationships between the data may be described as cardinalities or relative cardinalities. For example, a category may have a one-to-many relationship with products, meaning that each category may have many products (e.g. category "sporting equipment" may include products such as tennis rackets, basketballs and running shoes). Other relationships include one-to-one, many-to-one or others. Thus, cardinality determining module 115 may access the data layout and/or the underlying data directly to determine the relative cardinalities 116 of the data objects 141.

Insertion point determining module 125 may also receive a hierarchies input 121 from hierarchy determining module. Like the cardinality determining module 115, hierarchy determining module 120 may access data layout and/or data objects 141 to determine whether and how the data objects are arranged. For instance, the data objects may be arranged in one or more different hierarchies. Referring to the example above, a hierarchy may include category, product, sub-product. Thus, in this example, a hierarchy may include "sporting equipment" as the category, tennis rackets as a sub-category and children's tennis rackets as a product. As will be understood, this is only one simplistic example of the many different types and varieties of hierarchies that may be used herewith.

Accordingly, using the determined hierarchies 121 and relative cardinalities 116, insertion point determining module 125 can determine an optimal insertion point 126 for inserting any new data in information 106. Inserting module 130 may then be used to actually insert the new data into the data layout at the determined optimal insertion point. This concept, along with the other concepts mentioned above, will be explained in greater detail below with regard to methods 200 and 300 of FIGS. 2 and 3.

Figure 2:
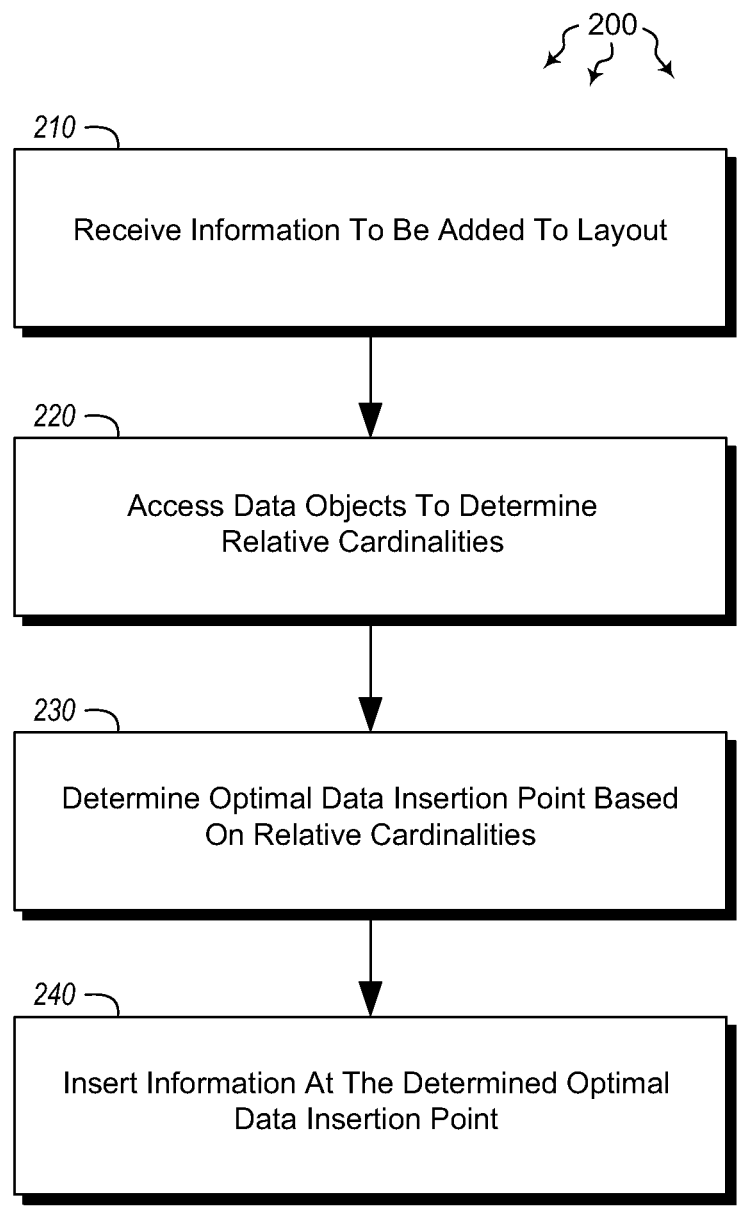
FIG. 2 illustrates a flowchart of an example method for determining a data insertion point in a data layout based on relative cardinalities between data objects.
Figure 3:
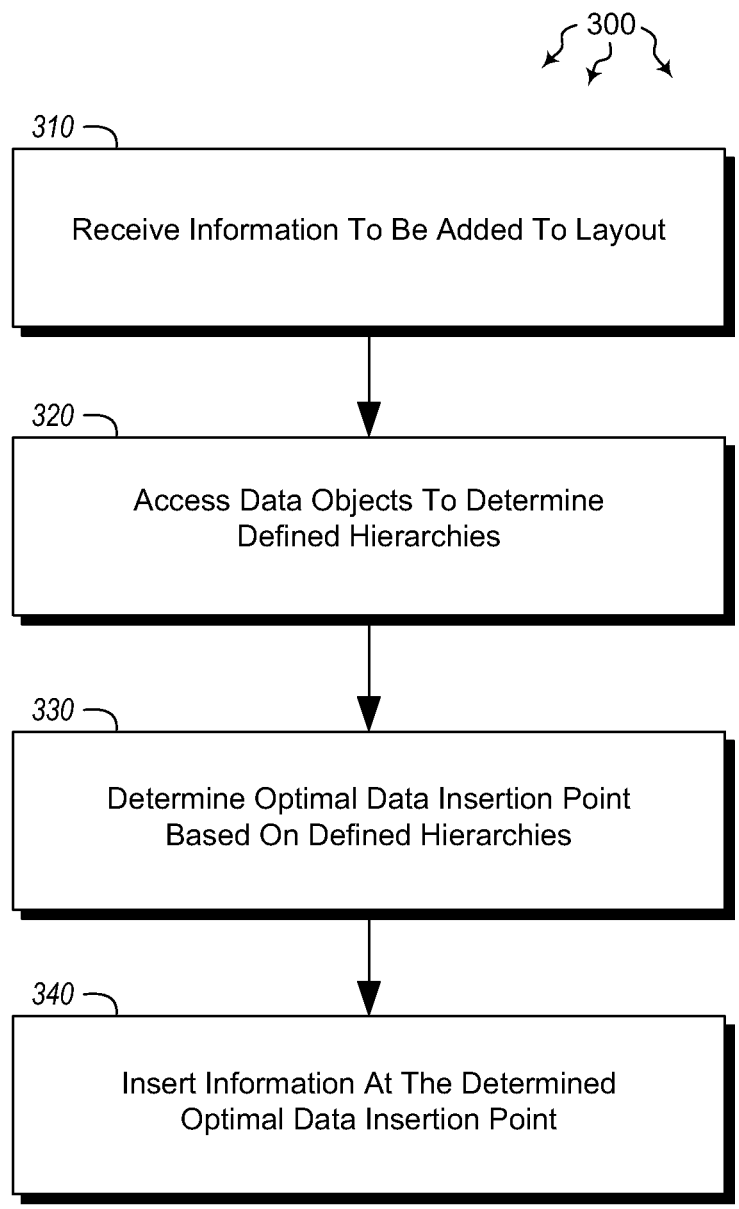
FIG. 3 illustrates a flowchart of an example method for determining a data insertion point in a data layout based on defined hierarchies between data objects.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining a data insertion point in a data layout based on relative cardinalities between data objects. The method 200 will now be described with frequent reference to the components and data of environment 100.

Method 200 includes an act of receiving a user input indicating that an additional portion of information is to be added to an existing data layout, wherein the data layout comprises a plurality of different data objects (act 210). For example, input receiving module 110 may receive information 106 from user 105 that is to be added to data layout 140, which includes data objects 141. Other input data such as metadata 107 may also be received by the input receiving module. Metadata may include hierarchy information, grouping information that indicates whether a data object is to be used for grouping, or other types of information. The received information and metadata may be passed to other modules within computer system 101.

Method 200 includes an act of accessing the plurality of data objects to determine relative cardinalities between the data objects in the data layout and the additional portion of information (act 220). For example, cardinality determining module 115 may access data objects 141 of data layout 140 and/or metadata 107 to determine the relative cardinalities between the data objects and information 106. As explained above, each data object may have different cardinality relationships to other data objects in the layout. For example, one data object may have a one-to-many relationship to one data object and a many-to-one relationship to another data object. It will be understood that each data object may have substantially any number of relationships to other data objects, and that each of those relationships may have a different cardinality.

Method 200 includes an act of determining an optimal data insertion point for inserting the additional portion of information based on the determined relative cardinalities (act 230). For example, insertion point determining module 125 may determine an optimal data insertion point 126 for inserting the additional information 106 based on the determined relative cardinalities 116 between data objects 141. Although the optimal insertion point is shown in FIG. 1 as being at a column in a tabular data layout, it will be understood that an optimal insertion point may be at any location in a data layout, in any type of data layout.

In some cases, multiple potential insertion points exist in the data layout. Each of these potential insertion points may be evaluated to achieve the greatest understandability or readability. For example, in some cases, an optimal insertion point will be a point which results in the least number of cardinality changes, or results in a relationship path with the least number of cardinality changes. In some cases involving tabular layouts, determining the optimal data insertion point among the different potential insertion points includes identifying the insertion point that results in the fewest number of blank data cells.

In some cases, the optimal data insertion point may be determined according to a relationship cardinality rule which indicates that groups are to be added in locations which conform to a one-to-one or one-to-many relationship between parent groups and child groups. In other cases, the optimal data insertion point may be determined according to an entity fields rule which indicates that if the additional portion of information is a field and a group of data objects already exists for the entity that includes the field, the field is added to the details of the existing group of data objects.

Additionally or alternatively, the optimal data insertion point may be determined according to a non-grouping field rule which indicates that if the additional portion of information 106 being inserted is a field and a group of data objects does not already exist for the entity that includes the field, and metadata 107 associated with the layout indicates the field is not to be grouped on, the entity that includes the field is to be inserted as a group of data objects instead, with the field added as detail information for the group of objects. In some cases, user 105 may add the metadata associated with the layout indicating that the field is not to be grouped on. The user may add such metadata so that grouping of the additional portion of information based on that designated field is avoided. In some cases, the additional portion of information may then be grouped based on an identified, substitute field.

Insertion point determining module 125 may also determine the optimal data insertion point according to a grouping field rule which indicates that when the additional portion of information 106 being inserted is a field and no group of data objects already exists for the entity that includes the field and no metadata associated with the layout indicates the field is not to be grouped on, the field is added as a group. In still further cases, the optimal data insertion point may be determined according to a lowest valid position rule which indicates that when more than one valid location to insert the item exists, the innermost position in the layout is to be used as the insertion point.

Method 200 includes an act of inserting the additional portion of information in the existing data layout at the determined optimal data insertion point (act 240). For example, inserting module 130 may insert the additional portion of information 106 into data layout 140 at the determined optimal data insertion point 126. When the data is inserted, a new space in the layout is created, which may include creating a new row, column, cell, blank space or other area in the data layout. In some embodiments, a default insertion point is identified for each data layout. In such cases, upon determining that no cardinality or hierarchy information is available, the additional portion of information is inserted at the default insertion point. User 105 may, however, be able to override the default insertion point and select a new insertion point.

Additionally or alternatively, in some cases, data may be automatically inserted into an existing data layout according to an automatic item insertion algorithm. The automatic item insertion algorithm may be applied as follows: Given a current layout and an item to be added, if a hierarchy is shared by the item and a group in the layout, then create a group for the item and apply the hierarchy rule to add the group to the layout. Otherwise, if the item to be added is an entity, then create an entity group for the entity and apply the relationship cardinality rule to add the group to the layout and add the default fields for the entity to the group. Otherwise, if there is no entity group in the layout for the entity which contains the field, and if the field is marked not to group, then create an entity group for the entity which contains the field. Otherwise, create a field group for the field, apply the relationship cardinality rule to add the group to the layout and add the field as the innermost detail in the group.

As referenced above, the hierarchy rule may include the following steps: given a current layout and an added group for each hierarchy, determine the set of ancestor items above the added group's item in the hierarchy and determine the set of descendant items below the added group's item in the hierarchy. For each possible group insertion position within the layout, determine the set of ancestor groups above the insertion position in the layout determine the set of descendant groups below the insertion position in the layout count ancestor items which appear in ancestor groups (referred to herein as AIAG), count ancestor items which appear in descendant groups (referred to herein as AIDG), count descendant items which appear in ancestor groups (referred to herein as DIAG), count descendant items which appear in descendant groups (referred to herein as DIDG), and if (AIAG>0 or DIDG>0) and AIDG=0 and DIAG=0, then remember the insertion position as a candidate position, apply the remove ancestor candidates rule and insert the group at any remaining candidate.

The remove ancestor candidates rule may include the following steps: given a current layout and candidates, for each insertion position in the candidates, if any descendant of the insertion position within the layout is also in the candidates, then remove the insertion position from the candidates.

Similarly, the relationship cardinality rule may include the following steps: given a current layout and an added group: for each insertion position within the layout, if the insertion position has a child group, then calculate the relative cardinality between the added group and the child group. Otherwise, treat the relative cardinality as one-to-one between the added group and the child group. If the insertion position has a parent group, then calculate the relative cardinality between the added group and the parent group. Otherwise, treat the relative cardinality as one-to-one between the added group and the parent group. If the cardinality from the added group to the child group is one-to-one or one-to-many and the cardinality from the added group to the parent group is one-to-one or many-to-one, then remember the insertion position as a candidate and apply the remove ancestor candidates rule. Then insert the group at any remaining candidate.

Turning now to FIG. 3, FIG. 3 illustrates a flowchart of a method 300 for determining a data insertion point in a data layout based on defined hierarchies between data objects. The method 300 will now be described with frequent reference to the components and data of environment 100 of FIG. 1 and FIGS. 4A and 4B.

Method 300 includes an act of receiving a user input indicating that an additional portion of information is to be added to an existing data layout, wherein the data layout comprises a plurality of different data objects (act 310). For example, information 106 may be received by input receiving module 110. The information is to be added to data layout 140, which includes multiple different data objects 141. The added information may be any type of data including text, pictures, videos, documents or other files, or any other type of data.

Method 300 includes an act of accessing the plurality of data objects to determine one or more defined hierarchies between the data objects in the data layout (act 320). For example, hierarchy determining module 120 may access data objects 141 and/or metadata 107 to determine if there are any defined hierarchies between the data objects and, if so, to determine what those hierarchies are. Such hierarchies, as explained above, may include any sequences or arrangements of data where the data is grouped or ordered hierarchically. This hierarchy data 121 may be sent to the insertion point determining module to aid in determining where the optimal insertion point is for that specific data layout.

Method 300 includes an act of determining an optimal data insertion point for inserting the additional portion of information based on the defined hierarchies between the data objects (act 330). For example, insertion point determining module 125 may determine an optimal insertion point for inserting information 106 into data layout 140. As with the embodiments described above, any of the rules described above may be applied here, with the use of the determined hierarchy information instead of (or, in some cases, in addition to) the relative cardinality information 116. Moreover, as with the above embodiments, a default insertion point may be identified for each data layout, so that upon determining that no hierarchy information is available, the additional portion of information may be inserted at the default insertion point. In some cases, the optimal data insertion point 126 may be determined according to a hierarchy rule which indicates that for hierarchies defined in metadata 107 associated with the layout 140, if the additional portion of information also appears in the hierarchy, the additional portion of information is added in a position which corresponds to its location in the hierarchy.

As shown in FIGS. 4A and 4B, in cases where the data layout is in tabular form, the new data may be inserted as a new column or as a new row. For example, in FIG. 4A, the determined optimal insertion point 426A may lie between the first and second columns of data layout 440A. The new column with the added information 450A may be added at the insertion point, so that the new data sits in a column between the first and second columns. Similarly, in FIG. 4B, the determined optimal insertion point 426B may lie between the second and third rows of data layout 440B. The new row with the added information 450B may be added at the insertion point, so that the new data sits in a row between the second and third rows.

Returning to FIG. 3, method 300 also includes an act of inserting the additional portion of information in the existing data layout at the determined optimal data insertion point (act 340). For example, inserting module 130 may insert the additional information 106 into the data layout at the determined optimal insertion point. In some cases, the user may be able to dynamically add or remove the new data by activating a selectable box or button. Moreover, the user may be able to modify the determined insertion point after it is initially chosen. Thus, in cases where the user would like a different insertion point, the user has this option.

Accordingly, methods, systems and computer program products are provided which determine a data insertion point in a data layout based on relative cardinalities between data objects. Moreover methods, systems and computer program products are provided which determine a data insertion point in a data layout based on defined hierarchies between data objects. Newly added information can then be inserted at the determined optimal data insertion point.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for determining a data insertion point in a data layout based on relative cardinalities between data objects, the method comprising:
   an act of receiving a user input indicating that an additional portion of information is to be added to an existing data layout, wherein the data layout comprises a plurality of different data objects;
   an act of accessing the plurality of data objects to determine relative cardinalities between the data objects in the data layout and the additional portion of information;
   an act of determining an optimal data insertion point for inserting the additional portion of information into the data layout based on the determined relative cardinalities;
   wherein the act of determining an optimal point includes an act of determining the insertion point that results in fewest blank cells; and
   an act of inserting the additional portion of information in the existing data layout at the determined optimal data insertion point.

2. The method of claim 1, wherein a plurality of potential insertion points exist in the data layout.

3. The method of claim 1, wherein the optimal data insertion point is determined according to an entity fields rule which indicates that if the additional portion of information is a field and a group of data objects already exists for the entity that includes the field, the field is added to the details of the existing group of data objects.

4. The method of claim 1, wherein the optimal data insertion point is determined according to a non-grouping field rule which indicates that if the additional portion of information being inserted is a field and a group of data objects does not already exist for an entity that includes the field, and metadata associated with the layout indicates the field is not to be grouped on, the entity that includes the field is to be inserted as a group of data objects instead, with the field added as detail information for the group of data objects.

5. The method of claim 4, wherein the user adds the metadata associated with the data objects indicating that the field is not to be grouped on.

6. The method of claim 5, wherein the additional portion of information is grouped based on an identified, substitute field.

7. The method of claim 1, wherein the optimal data insertion point is determined according to a grouping field rule which indicates that when the additional portion of information being inserted is a field and no group of data objects already exists for an entity that includes the field and no metadata associated with the layout indicates the field is not to be grouped on, the field is added as a group of data objects.

8. The method of claim 1, wherein the optimal data insertion point is determined according to a relationship cardinality rule which indicates that groups are to be added in locations which conform to at least one of one-to-one or one-to-many relationships between parent groups and child groups.

9. The method of claim 1, wherein the optimal data insertion point is determined according to a lowest valid position rule which indicates that when more than one valid location to insert an item exists, the innermost position in the layout is to be used as the insertion point.

10. A computer program product for implementing a method for determining a data insertion point in a data layout based on defined hierarchies between data objects, the computer program product comprising a computer-readable storage device having stored thereon computer-executable instructions that, when executed by one or more processors of the computing system, cause the computing system to perform the method, the method comprising:
    an act of receiving a user input indicating that an additional portion of information is to be added to an existing data layout, wherein the data layout comprises a plurality of different data objects;
    an act of accessing the plurality of data objects to determine one or more defined hierarchies and one or more relative cardinalities between the data objects in the data layout and the additional portion of information;
    an act of determining an optimal data insertion point for inserting the additional portion of information into the data layout based on the defined hierarchies and the determined relative cardinalities between the data objects;
    wherein the act of determining an optimal point includes an act of determining the insertion point that results in fewest blank cells;
    an act of inserting the additional portion of information in the existing data layout at the determined optimal data insertion point.

11. The computer program product of claim 10, wherein the additional portion of information is dynamically added or removed at the selection of the user.

12. The computer program product of claim 10, wherein a default insertion point is identified for each data layout, such that upon determining that no hierarchy information is available, the additional portion of information is inserted at the default insertion point.

13. The computer program product of claim 10, wherein the user modifies the insertion point after the insertion point is initially chosen.

14. The computer program product of claim 10, wherein a plurality of potential insertion points exist in the data layout.

15. The computer program product of claim 10, wherein the optimal data insertion point is determined according to an entity fields rule which indicates that if the additional portion of information is a field and a group of data objects already exists for the entity that includes the field, the field is added to the details of the existing group of data objects.

16. The computer program product of claim 10, wherein the optimal data insertion point is determined according to a non-grouping field rule which indicates that if the additional portion of information being inserted is a field and a group of data objects does not already exist for an entity that includes the field, and metadata associated with the layout indicates the field is not to be grouped on, the entity that includes the field is to be inserted as a group of data objects instead, with the field added as detail information for the group of data objects.

17. The computer program product of claim 10, wherein the optimal data insertion point is determined according to a grouping field rule which indicates that when the additional portion of information being inserted is a field and no group of data objects already exists for an entity that includes the field and no metadata associated with the layout indicates the field is not to be grouped on, the field is added as a group of data objects.

18. The computer program product of claim 10, wherein the optimal data insertion point is determined according to a lowest valid position rule which indicates that when more than one valid location to insert an item exists, the innermost position in the layout is to be used as the insertion point.

19. The computer program product of claim 10, wherein the optimal data insertion point is determined according to a hierarchy rule which indicates that for hierarchies defined in metadata associated with the layout, if the additional portion of information also appears in the hierarchy, the additional portion of information is added in a position which corresponds to its location in the hierarchy.

20. A computer system comprising the following:
one or more processors;
system memory;
one or more computer-readable storage media having stored thereon computer-executable instructions that, when executed by the one or more processors, causes the computing system to perform a method for determining a data insertion point in a data layout based on relative cardinalities between data objects, the method comprising the following:
an act of receiving a user input indicating that an additional portion of information is to be added to an existing data layout, wherein the data layout comprises a plurality of different data objects and wherein the user input adds a portion of metadata associated with the layout indicating that various data objects are or are not to be grouped on;
an act of accessing the plurality of data objects to determine relative cardinalities between the data objects in the data layout;
an act of accessing the portion of metadata to determine on which data objects data is to be grouped;
an act of determining an optimal data insertion point for inserting the additional portion of information into the data layout based on both the determined relative cardinalities between the data objects and the metadata indicating which data objects are to be grouped on;
wherein the act of determining an optimal point includes an act of determining the insertion point that results in fewest blank cells; and
an act of inserting the additional portion of information in the existing data layout at the determined optimal data insertion point.

* * * * *